United States Patent
Carrie (10) Patent No.: US 11,305,868 B2
(45) Date of Patent: Apr. 19, 2022

(54) THREE-AXIS CONTROL STICK

(71) Applicant: RATIER-FIGEAC SAS, Figeac (FR)

(72) Inventor: Jean-Paul Carrie, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 537 days.

(21) Appl. No.: 16/095,518

(22) PCT Filed: Apr. 22, 2016

(86) PCT No.: PCT/IB2016/000666
§ 371 (c)(1),
(2) Date: Oct. 22, 2018

(87) PCT Pub. No.: WO2017/182835
PCT Pub. Date: Oct. 26, 2017

(65) Prior Publication Data
US 2019/0127046 A1    May 2, 2019

(51) Int. Cl.
*B64C 13/04*    (2006.01)

(52) U.S. Cl.
CPC ........... *B64C 13/0421* (2018.01); *Y02T 50/40* (2013.01)

(58) Field of Classification Search
CPC ..... B64C 13/04; B64C 13/0421; B64C 27/56; B64C 13/30; Y02T 50/40; G05G 9/047; G05G 2009/04718; G05G 2009/04748; G05G 2009/04751
See application file for complete search history.

(56) References Cited

U.S. PATENT DOCUMENTS

| | | | | |
|---|---|---|---|---|
| 2,553,280 | A | * | 5/1951 | Henry ................. G05G 5/16 74/471 R |
| 4,420,808 | A | | 12/1983 | Diamond et al. |
| 4,667,909 | A | * | 5/1987 | Curci ................. B64C 27/56 244/234 |
| 4,795,952 | A | * | 1/1989 | Brandstetter .......... G05G 9/047 318/560 |
| 5,001,646 | A | | 3/1991 | Caldwell et al. |
| 5,002,241 | A | * | 3/1991 | Tizac .................... G05G 9/047 244/237 |

(Continued)

FOREIGN PATENT DOCUMENTS

CN    1511235 A    7/2004
EP    2136279 A2   12/2009

OTHER PUBLICATIONS

International Search Report for Application No. PCT/IB2016/000666, dated Nov. 3, 2016, 2 pages.
(Continued)

*Primary Examiner* — Medhat Badawi
*Assistant Examiner* — Vicente Rodriguez
(74) *Attorney, Agent, or Firm* — Cantor Colburn LLP (57) ABSTRACT

There is provided a control stick module (10) comprising: a first shaft (100); a second shaft (110); a joint (140) connecting the first and second shafts; and a gimbal mechanism (120); wherein the joint is nested within the gimbal mechanism. The gimbal mechanism provides axes of rotation (201, 202) for the first shaft (100) and the joint provides axes of rotation (203, 204, 205) for the first shaft (100); and the axes of rotation (201, 202) provided by the gimbal mechanism intersect at a point corresponding to a point of intersection of the axes (203, 204, 205) provided by the joint.

11 Claims, 5 Drawing Sheets

(56) References Cited

U.S. PATENT DOCUMENTS

| | | | |
|---|---|---|---|
| 5,395,077 A | | 3/1995 | Wolford |
| 6,149,527 A | * | 11/2000 | Wolford ................. F16D 3/40 |
| | | | 464/136 |
| 6,885,917 B2 | | 4/2005 | Osder et al. |
| 9,045,219 B2 | | 6/2015 | Bandera et al. |
| 9,051,836 B2 | | 6/2015 | Yates et al. |
| 2009/0146018 A1 | | 6/2009 | Konig |
| 2009/0230252 A1 | * | 9/2009 | Daunois ................. B64C 27/56 |
| | | | 244/234 |
| 2009/0319097 A1 | | 12/2009 | Bandera et al. |
| 2016/0004270 A1 | * | 1/2016 | Taylor ................... G05G 9/047 |
| | | | 74/491 |
| 2017/0050721 A1 | * | 2/2017 | Voiles ................... B64C 13/343 |

OTHER PUBLICATIONS

Written Opinion of the International Searching Authority for Application No. PCT/IB2016/000666, dated Nov. 3, 2016, 5 pages.
G. I. Zhitomirskiy, A design of aircrafts the Publishing House "Mashinostroenie", Moscow, 1991, 400 pages in total, pp. 311-314.
Russian Office Action for Application No. 2018139020/11 (064874), dated Oct. 4, 2019, 5 pages.
Chinese Office Action for CN Application No. 201680084844.6 (Translation) dated Aug. 26, 2021, 8 pages.
CN1511235A Abstract, 2 pages.
Chinese Office Action for CN Application No. 201680084844.6, dated Aug. 26, 2021, 7 pages.

\* cited by examiner

THREE-AXIS CONTROL STICK

CROSS REFERENCE TO RELATED APPLICATIONS

This is a US National Stage of Application No. PCT/IB2016/000666, filed on Apr. 22, 2016, the disclosures of which are incorporated herein by reference.

FIELD

The present disclosure relates to an assembly for a control system, for example to an assembly for a control system comprising a three-axis control stick.

BACKGROUND

In a vehicle an assembly for a control system is provided to control at least some of the movement or dynamics of the vehicle. For example, in a vehicle such as an aeroplane, a helicopter, or a watercraft, a control stick may be provided to control dynamics such as the pitch and roll. Typically, other control features may also be provided to control other dynamics. For example, pedals and/or levers may control a rudder and/or the yaw of the vehicle.

Some systems incorporate control of a plurality of dynamics into a single system. A three-axis control stick for example can be arranged to control the pitch, roll and yaw of a vehicle by allowing rotation of the control stick about three axes. However, incorporating an increasing number of control capabilities into a single system requires that the complexity of the system be increased, both in terms of mechanical and structural complexity, but also in terms of usability for e.g. a pilot.

It is critical that a control system be sufficiently intuitive and/or easy to use such that a vehicle can be safely controlled. The movements of the controls can also broadly mimic those that the vehicle performs as a result of them. For example, a three-axis control stick may control the roll of an aircraft based on its leftward and rightward movement about an axis along the forward direction; it may control the pitch based on its forward and rearward movement about an axis perpendicular to the forward direction; and it may control the yaw based on the rotational position about an axis defined by the extension direction of the stick itself.

Such conventional systems have generally been considered satisfactory for their intended purpose. However, there is still a need in the art for improved assemblies for control systems. The present disclosure provides a solution for this need.

SUMMARY

According to an embodiment of the disclosure there is provided an assembly comprising: a first shaft; a second shaft; a joint connecting the first and second shafts; and a gimbal mechanism; wherein the joint is nested within the gimbal mechanism and an origin of rotation of the joint is coincident with an origin of rotation of the gimbal mechanism. The joint may be rotatable within the gimbal mechanism. That is, the joint may be rotated relative to the gimbal mechanism about a longitudinal direction of the joint (e.g., corresponding to twist of the first shaft), to transmit torque from one end of the joint to the other, independently of the gimbal mechanism (i.e., without causing rotation of the gimbal mechanism).

In a further embodiment of the above, the gimbal mechanism may provide axes of rotation for the first shaft and the joint may provide axes of rotation for the first shaft; wherein the axes of rotation provided by the gimbal mechanism and the axes of rotation provided by the joint intersect at the coincident origins of rotation.

In a further embodiment of any of the above the gimbal mechanism may comprise a first gimbal disposed within and rotatably coupled to a second gimbal.

In a further embodiment of any of the above the second gimbal may be disposed within and rotatably coupled to a frame.

In a further embodiment of any of the above the first shaft may be rotatable about each of a first axis, a second axis, and a third axis; and rotation of the first shaft about the first axis may cause the first gimbal to rotate about the first axis, rotation of the first shaft about the second axis may cause the first and second gimbals to rotate about the second axis, and rotation of the first shaft about the third axis may cause rotation of the second shaft about its length.

In a further embodiment of any of the above rotation of the first gimbal about the first axis may control a first control parameter, rotation of the second gimbal about the second axis may control a second control parameter, and rotation of the second shaft about its length may control a third control parameter.

In a further embodiment of any of the above the first, second and third axes may intersect with each other within the joint.

In a further embodiment of any of the above the third axis may be defined along the length of the first shaft.

In a further embodiment of any of the above the assembly may further comprise a grip mounted on the first shaft.

In a further embodiment of any of the above the assembly may be a control stick for a control system. It may be for controlling an aircraft.

In a further embodiment of any of the above the movement of the grip may be configured to correspond intuitively to the control parameters controlled by the movement. For example, the movement of the grip in a fore and aft direction may control pitch, movement of the grip in the left and right direction may control roll, and rotation of the grip about its length may control yaw.

In a further embodiment of any of the above the joint may be a universal joint. The joint may comprise a pair of forked hinges connected by a cross shaft.

According to another embodiment of the disclosure there is provided a method of controlling a control system comprising the assembly according to any of the above embodiments, the method comprising rotating the first shaft about the origin of rotation of the joint nested within the gimbal mechanism, during which the origin of rotation of the joint coincides with the origin of rotation of the gimbal mechanism.

In a further embodiment of the above, the method may comprise rotating the first shaft and the first gimbal about a first axis to control the first control parameter of an aircraft; rotating the first shaft, the first gimbal, and the second gimbal about a second axis to control the second control parameter of the aircraft; and rotating the first shaft about a third axis to control the third control parameter of the aircraft. The first, second, and third control parameters may correspond to the pitch, roll, and yaw of the aircraft respectively. Alternatively, the first, second and third control parameters may correspond to the roll, pitch, and yaw of the aircraft respectively. The first, second, and third control parameters may correspond to any suitable controls.

The joint may be rotatable within the gimbal mechanism. That is, the joint may be rotated relative to the gimbal mechanism and independent of it. For example, when the first shaft is rotated about the third axis only, the joint may rotate without the gimbal mechanism rotating. In any event, the gimbal mechanism and the joint may both provide axes of rotation for the first shaft, wherein the axes intersect with each other at a point within the joint, regardless of the rotation of the joint within the gimbal mechanism.

The joint may be disposed entirely within the gimbal mechanism, and may be disposed entirely within the first gimbal. The joint may be disposed partially or substantially within the gimbal mechanism or the first gimbal. The first gimbal may be arranged to house the joint, or to substantially or partially surround it.

The first gimbal may be arranged to permit the first shaft to pass into the gimbal mechanism. The first gimbal may be arranged to permit rotation of the first shaft relative thereto, and may be further arranged to permit only rotation of the first shaft about the length of the first shaft relative to the first gimbal. That is, the first shaft may only rotate about its own length relative to the first gimbal. The first gimbal may be arranged to rotate with the first shaft in all cases except for when the first shaft rotates about the third axis. For example, the position of the first gimbal may be fixed with respect to the position of the first shaft (though the rotation of the joint within the first gimbal may still be possible).

The gimbal mechanism may be arranged to permit movement of the first shaft to any angular position within a predetermined solid angle, e.g. within the range of movement defined by the limits of rotation of the first and second gimbals. The first shaft may be arranged to move within a spherical sector or cone, or may be arrange to move within a geodesic of an ellipsoid. The joint may permit the first shaft to rotate about its own length (e.g. about the third axis) to occupy any rotational orientation, in addition to the movement permitted by the gimbal mechanism.

The second shaft may be arranged such that it only rotates about its own length. The second shaft may transmit only rotation of the first shaft about the third axis. A first end of the second shaft may be connected to the first shaft at the joint, and a second end of the second shaft may be connected to a bearing.

The first, second, and third axes all intersect with each other at point located within the joint below the grip in the operating orientation. The joint may include fourth and fifth axes that permit the angle of the first shaft to pivot in any direction compared to the angle of the second shaft. The fourth and fifth axes may be collinear with the second and third axes (defined by the gimbal mechanism), for example when the first shaft is in a neutral position. The fourth and fifth axes may not be collinear with the second and third axes, and may sweep through a plane orthogonal to the third axis.

The first axes and second axis are provided by the gimbal mechanism. The first axis may be provided by the first gimbal and the second axis may be provided by the second gimbal. The third, fourth, and fifth axes are provided by the joint. The first and second axes intersect at an origin of rotation of the gimbal mechanism. The third, fourth, and fifth axes intersect at an origin of rotation of the joint. The origin of rotation of the gimbal mechanism is coincident—i.e. at the same location—as the origin of rotation of the joint.

The joint may be any type of joint between first and second shafts that allows any orientation therebetween. It might be, for example, a constant-velocity (CV) joint, such as a homokinetic joint, a Rzeppa-joint, a Weiss joint, a Thompson coupling, a Tracta joint, and/or a Malpezzi joint.

The joint need not be a constant-velocity joint because of the limited amount of rotation required, which may be as little as 120 degrees. A more conventional universal joint comprising a pair of forks connected a cross-shaft is a good solution due to its simplicity, reliability, and operation. Other flexible coupling arrangements may also be appropriate for transmitting torque from the first shaft to the second shaft independently of the gimbal mechanism.

The assembly may comprise sensors to measure and monitor the rotation of the first gimbal, the second gimbal, and the second shaft. The sensors may measure and monitor the rotation with respect to a frame. The sensors may be configured to control the control parameters based on the measured rotation of the first gimbal, second gimbal, and second shaft.

The assembly may be provided for controlling the operation of a rudder on an aircraft. The assembly may be part of a control stick module for an aircraft. The present disclosure further extends to an aircraft fitted with a control stick module which comprises an assembly according to one of the above described embodiments. In particular, such an aircraft may use the control stick module to control the operation of its rudder. The aircraft may be configured so that a pilot can control the operation of the aircraft's rudder using his/her hands, rather than his/her feet. There may be an absence of pedals for the pilot, or pedals may be provided for other aircraft functions.

The present disclosure may also extend to a method of controlling a rudder of an aircraft comprising rotating a first shaft of an assembly or module according to any of the above described embodiments about the origin of rotation of the joint nested within the gimbal mechanism, during which the origin of rotation of the joint coincides with the origin of rotation of the gimbal mechanism.

These and other features of the systems of the subject disclosure will become more readily apparent to those skilled in the art from the following detailed description taken in conjunction with the drawings.

FIGURES

So that those skilled in the art to which the subject disclosure appertains will readily understand how to make and use the devices of the subject disclosure without undue experimentation, embodiments thereof will be described in detail herein below by way of example and with reference to certain figures, wherein.

DETAILED DESCRIPTION

Figure 1:
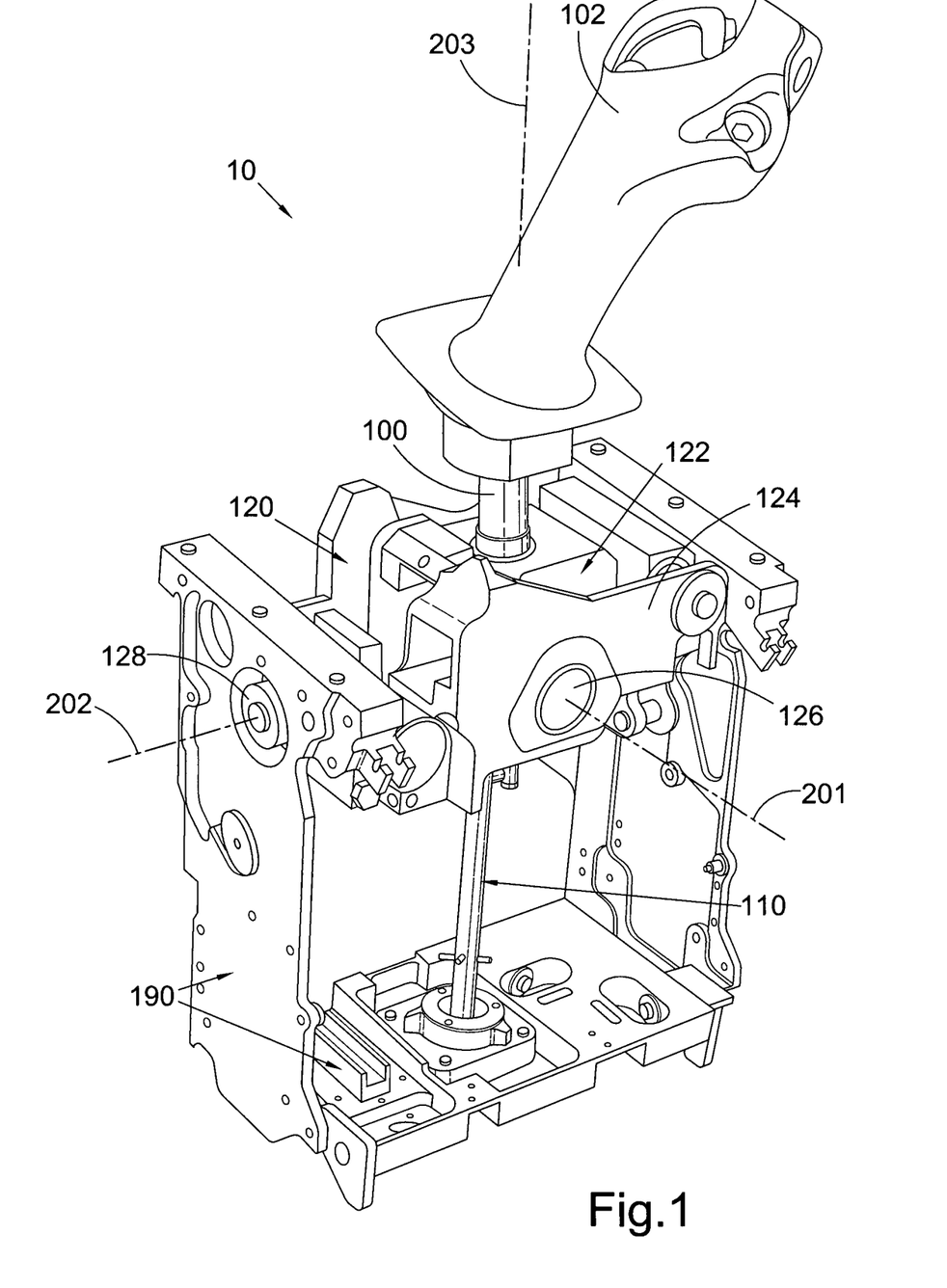
FIG. 1 shows an exemplary three-axis control stick module for an aircraft.
Figure 2:
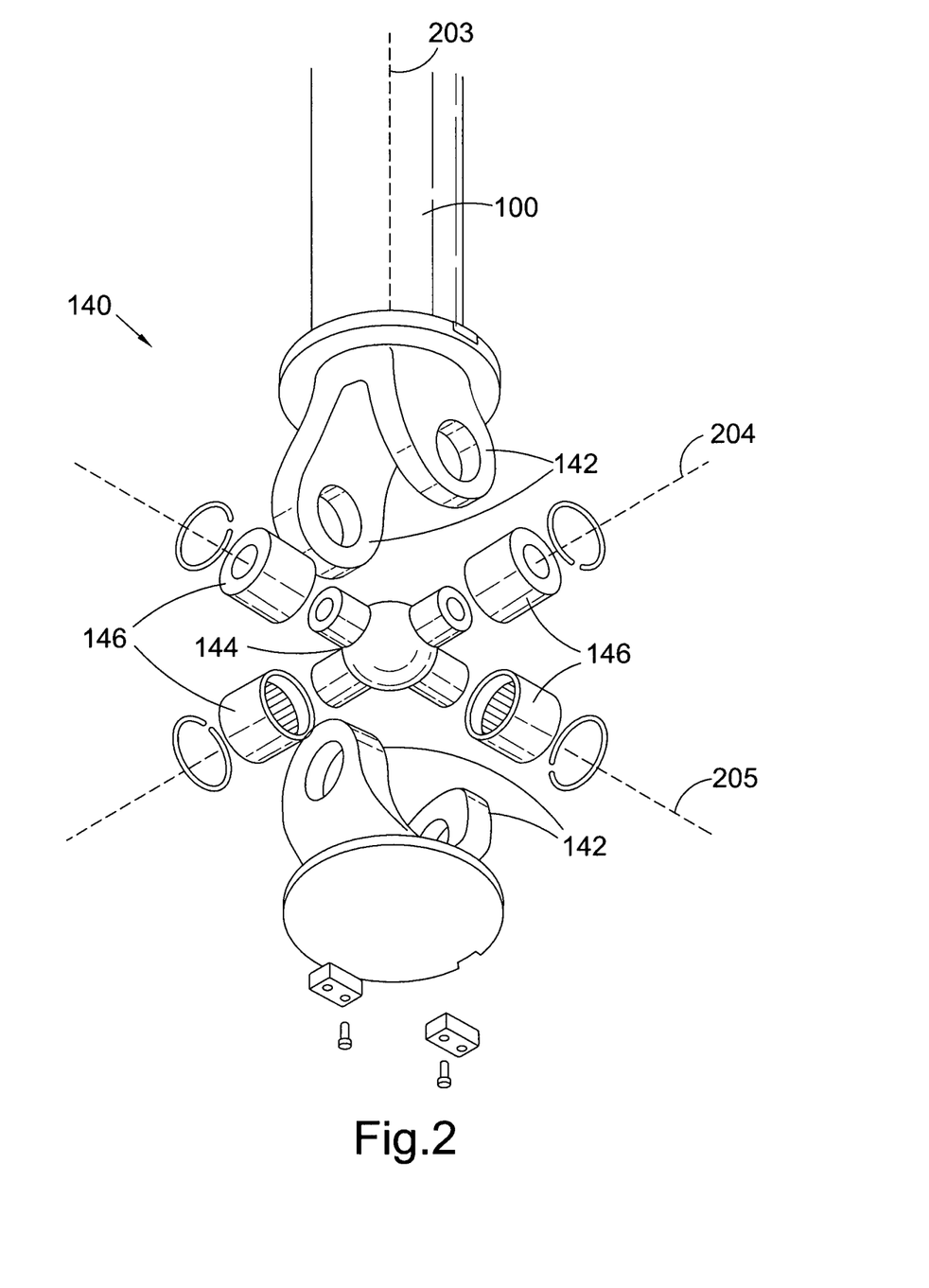
FIG. 2 shows an exemplary joint for use in the module of FIG. 1.
Figure 3:
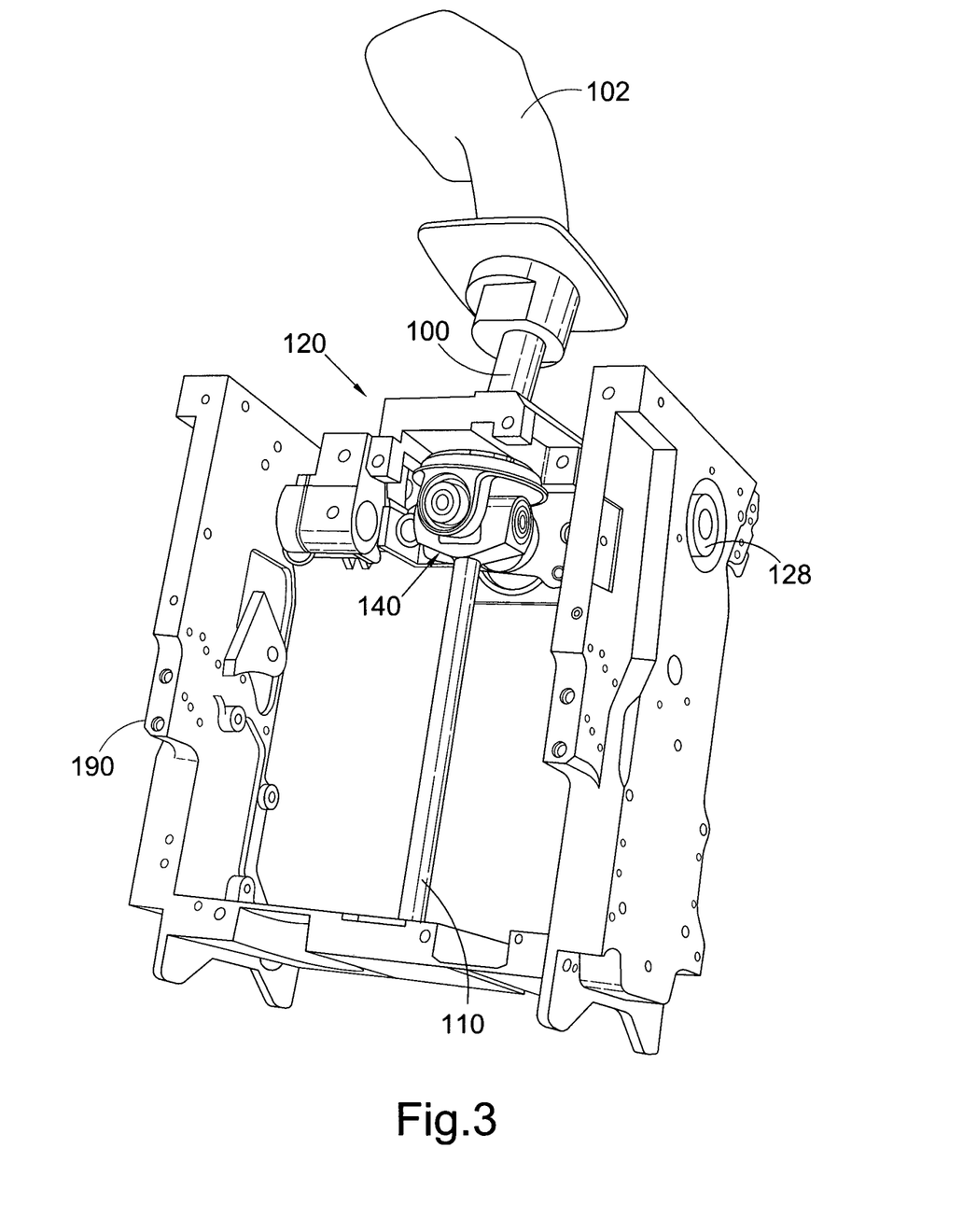
FIG. 3 shows a section view of an exemplary control stick module for an aircraft.
Figure 4:
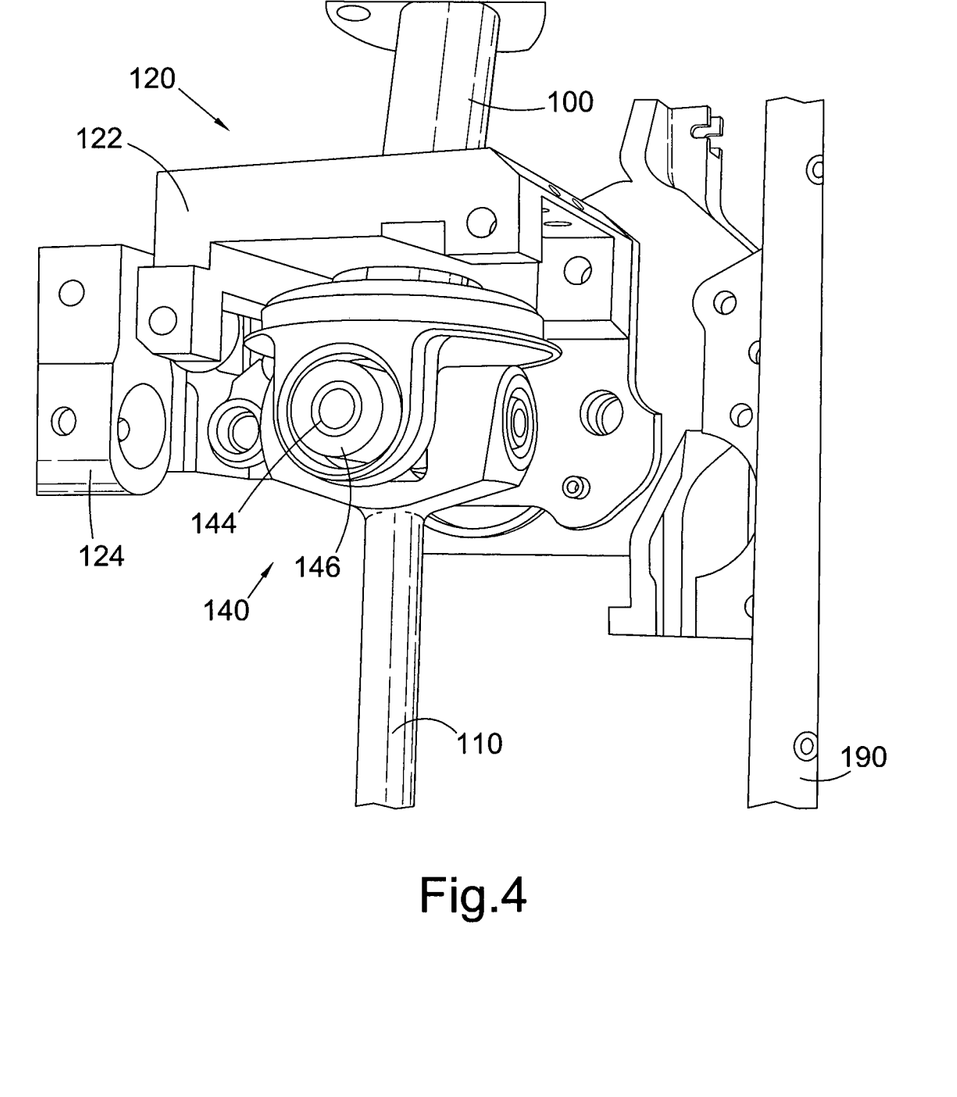
FIG. 4 shows an exemplary joint within a gimbal mechanism of the control stick.

Reference will now be made to the drawings wherein like reference numerals identify similar structural features or aspects of the subject disclosure. For purposes of explanation and illustration, and not limitation, an illustrative view of an embodiment of a control stick module in accordance with the disclosure is shown in FIG. 1 and is designated generally by reference character 10. Other aspects of this disclosure are shown in FIGS. 2 to 4. The assembly described herein can be used to control the dynamics and/or movements of a system. For example, it may control flight control parameters of an aircraft, movement parameters of water based craft (such as submarines, hydrofoils, hovercrafts etc.), control parameters of all-terrain vehicles, tanks, drones, jetpacks, wheelchairs, remote controlled systems, and/or simulators.

FIG. 1 shows a control stick module 10 comprising a first shaft 100, a second shaft 110, and a gimbal mechanism 120 supported within a frame 190. The module comprises an assembly mounted to support the operation of the control stick. A joint 140 is nested within the gimbal mechanism. In the depicted module 10 the joint 140 is a universal joint. A grip 102 is fixed to or mounted on the first shaft 100 and may be used to control the position and orientation thereof.

The gimbal mechanism comprises a first gimbal 122 and a second gimbal 124, and defines a first axis 201 and a second axis 202 about which the gimbal mechanism allows the grip 102 and the first shaft 100 to be rotated. The first gimbal 122 rotates about the first axis 201 in response to rotation of the first shaft 100 about the first axis 201. The first gimbal 122 and the second gimbal 124 rotate about the second axis 202 in response to rotation of the first shaft 100 about the second axis 202. Therefore, the first axis 201 also rotates about the second axis 202 in response to the second gimbal 124 rotating about the second axis 202.

The first gimbal 122 is supported for rotation about the first axis 201 within the second gimbal 124 by a first pair of trunnions 126. The second gimbal 124 is supported for rotation about the second axis 202 within the frame 190 by a second pair of trunnions 128. The first shaft 100 may therefore be rotated about one end to take any position within a cone defined by the limits of movement of the first and second gimbals 122, 124.

The frame 190 may be a standard structure that is known to be suitable for use in aircraft, and may have a standard or known size, shape, arrangement etc. The control stick module may therefore be retro-fitted to existing assemblies for controlling systems and/or be disposed within existing spaces for such assemblies. Aircraft cockpits typically contain many components, and so space within cockpits must be carefully accounted for. The assembly herein described may be sized and/or arranged to fit within an existing location for an assembly for a control system. It can also avoid the need for other control systems, such as pedal or lever arrangements for controlling parameters such as yaw, freeing up space within the cockpit and reducing weight of the control systems.

The frame 190 may house other components (not shown) which are used in the aircraft and which may provide some of the functionality of the module. These may include sensors for measuring the rotation of the first gimbal 122, the second gimbal 124, and the second shaft 110. They may include components related to control of the system, and/or may include components not used for control of the system.

FIG. 2 shows the joint 140 (also known as a universal coupling, U-joint, Cardan joint, Hardy-Spicer joint, or Hooke's joint). The joint is formed on a first end of the first shaft 100 and a first end of the second shaft 110, and connects the first and second shafts 100, 110. The joint comprises forks 142 arranged to couple with the forks 142 of the opposing shaft. A cross-shaft 144 is enclosed within the forks and engaged therewith to hinge the first and second shafts 100, 110 together. Bushings 146 may be provided between the legs of the cross shaft 144 and the forks 142 to facilitate free movement of the joint 140.

As noted above, the joint 140 may be any other type of joint between first and second shafts that allows any orientation therebetween, such as a constant-velocity (CV) homokinetic joint.

In addition to the rotation of the first shaft 100 about the first 201 and second axes 202 (as defined by the gimbal mechanism 120), the joint 140 permits rotation of the first shaft 100 about a third axis 203 defined along the length of the first shaft 100. That is, the grip 102 and the first shaft 100 may be rotated about the third axis 203 in addition to rotation about one end about the first and second axes 201, 202, even when the grip 102 and first shaft 100 are deflected from a neutral upright position.

Rotation of the grip 102 and the first shaft 100 about the third axis 203 is transmitted to the second shaft 110. The second shaft 110 is arranged so that it may only rotate about its length. Therefore, any rotation of the second shaft 110 is a consequence of rotation of the first shaft 100. This rotation can be performed independently of any movement on the gimbal mechanism 120.

The joint 140 provides two additional axes of rotation, a fourth axis 204 and a fifth axis 205, defined by the legs of the cross shaft 144. The third axis 203, fourth axis 204, and fifth axis 205 are each perpendicular to the others. The fourth 204 and fifth 205 axes are located within a plane perpendicular to the third axis 203, and sweep around within that plane when the first shaft 100 is rotated about the third axis 203.

Depending on the rotational orientation of the first shaft 100 about the third axis 203, the fourth 204 and fifth 205 axes may or may not be collinear with the first and second axes 201, 202 as defined by the gimbal mechanism 120.

Therefore, the nesting of the joint 140 within the gimbal mechanism 120 allows the first shaft 100 to be rotated about the third axis 203, as well as deflected about the first and/or second axes 201, 202 as defined by the gimbal mechanism 120.

As can be seen in FIG. 3, wherein only part of the gimbal mechanism 120 is shown, the joint 140 is nested within the gimbal mechanism 120, and hence connects the first and second shafts 100, 110 for rotation, while permitting angular movement in any direction therebetween. Therefore, the joint 140, operating together with the gimbal mechanism 120, allows the grip 102 and the first shaft 100 to be positioned at any angle from upright within a predetermined solid angle, which may be circular or eccentric. Moreover, the joint 140 permits rotation of the grip 102 and first shaft 100 about the third axis 203, which rotation is transmitted to the second shaft 110, regardless of the position of the grip 102.

The orientation of the third axis 203 changes depending upon the rotation of the first shaft 100 about one end about the first and second axes 201, 202 i.e. the third axis 203 pivots about the joint 140 compared to the second shaft 110. In contrast, the orientation of the second axis 202 is fixed by the gimbal mechanism supported within the frame 190. The first axis 201 may rotate about the second axis 202 within a plane perpendicular thereto.

When the grip 102 is in the neutral upright position (e.g. as shown in FIG. 1), the three axes 201, 202, 203 map to orthogonal, three-dimensional Cartesian axes. However, whereas the first and second axes remain orthogonal to each other by virtue of the constrained movement of the gimbal mechanism 120 within the fixed frame 190, the orientation of the third axis 203 varies depending on the deflection of the first shaft 100 about the first and second axes 201, 202. For example, if the grip 102 is moved to its foremost position, the third axis 203 would not be perpendicular to the second axis 202 (though it may still be perpendicular to the first axis 201).

FIG. 4 shows a magnification of the joint 140 nested within the gimbal mechanism 120. The first gimbal 122 is configured to allow the first shaft 100 to enter through the top thereof, such that the joint 140 is nested within the gimbal mechanism 120 formed by the first gimbal 122 and second gimbal 124. The first shaft 100 may be formed of a single part, or may be formed of connected segments. In the depicted arrangement, the axes of rotation of the joint 140 other than the third axis 203—the fourth axis 204 and the fifth axis 205 described above defined by the legs of the cross shaft 144 within the plane perpendicular to the third axis 203—are collinear with the first and second axes 201, 202 of the gimbal mechanism, so that movement of the first shaft 100 about these first and second axes 201, 202 is facilitated. Alternatively, the fourth 204 and fifth 205 axes may not be collinear with the first and second axes 201, 202.

In any event, the three axes 201, 202, 203 intersect at a single point within the joint 140. When the grip is in the neutral upright position, the three axes 201, 202, 203 correspond to three-dimensional Cartesian axes and the point of intersections corresponds to the origin. However, regardless of the orientation of the third axis 203 with respect to the first and second axes 201, 202, the three axes still intersect at a point within the joint 140. As a consequence, rotation of the first shaft 100 and the grip 102 occurs about the same point, and is hence straightforward for a pilot to use and is intuitively arranged.

An alternative way to describe this arrangement is that the origin of rotation of the joint 140 is coincident with the origin of rotation of the gimbal mechanism 120.

FIGS. 5A-5D shows a series of exemplary arrangements of the axes. The first and second axes 201, 202 are provided by the gimbal mechanism 120. The third, fourth and fifth axes 203, 204, 205 are provided by the joint. The first and second axes 201, 202 are perpendicular to one another in all arrangements. The fourth and fifth axes 204, 205 are perpendicular to one another in all arrangements. A first origin of rotation 301 is defined by the intersection of the first and second axes 201, 202. A second origin of rotation 302 is defined by the intersection of the third, fourth, and fifth axes 203, 204, 205.

Figure 5A:
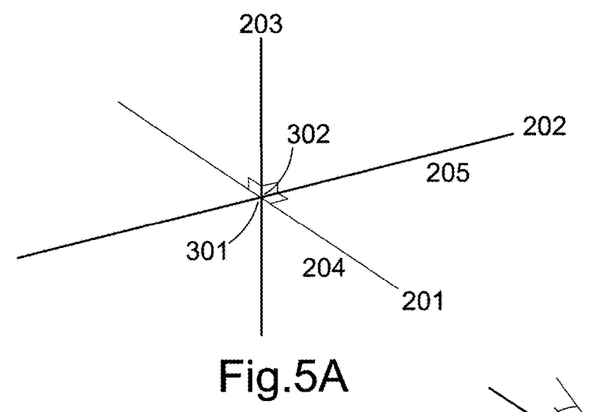
FIGS. 5A-5D shows an exemplary arrangement of axes of rotation of a joint and a gimbal mechanism of the control stick.
Figure 5B:
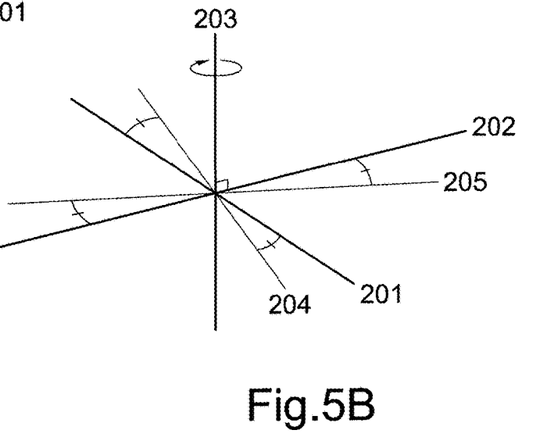
Figure 5C:
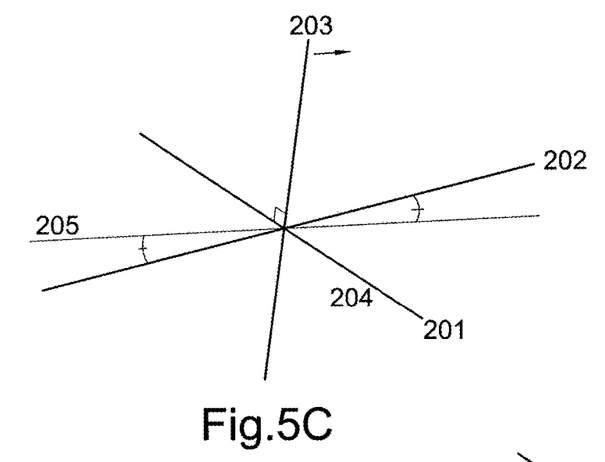
Figure 5D:
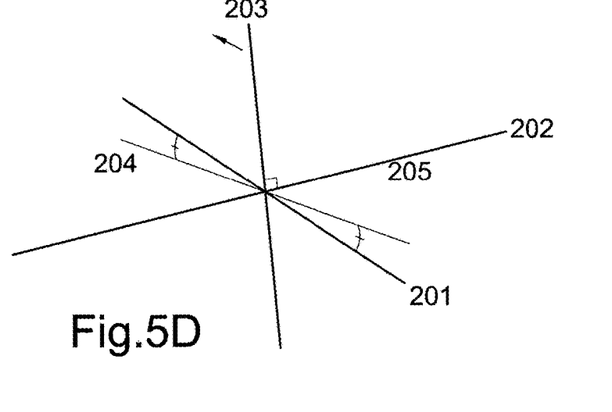

In FIG. 5A the first shaft 100 is in a neutral upright position, and the third axis 203 is perpendicular to the first axis 201 and to the second axis 202. The fourth axis 204 is collinear with the first axis 201, and the fifth axis 205 is collinear with the second axis 202. In FIG. 5B the first shaft 100 has been rotated about the third axis 203, and the fourth axis 204 and fifth axis 205 have rotated in the plane (defined by the first and second axes 201, 202) by an angle α. In FIG. 5C the first shaft 100 has been rotated about the first axis 201, so that the fifth axis 205 has rotated by an angle β in the plane defined by the second and third axes 202, 203. In FIG. 5D the first shaft has been rotated about the second axis 202, so that the fourth axis has rotated by an angle γ in the plane defined by the first and third axes 201, 203.

Of course, a combination of rotations about the first, second, and third axes 201, 202, 203 is possible. However, rotation of the first shaft 100 is constrained by the limited movement of the first and second axes 201, 202, which are limited by the mounting of the gimbal mechanism 120 in the frame 190. In all cases, the first origin of rotation 301 and the second origin of rotation 302 are coincident, i.e., they are located at the same point in space.

It is therefore evident that the grip 102 controls the rotational positions and/or orientations of the first gimbal 122, the second gimbal 124, and the second shaft 110 by movement of the first shaft 100. Rotation of the first gimbal 122 is used to control a first flight control parameter, rotation of the second gimbal 124 is used to control a second flight control parameter, and rotation of the second shaft 110 is used to control a third flight control parameter. Sensors (not shown) may be provided separately or as part of the assembly and may be configured to measure and/or monitor the rotation of the gimbal mechanism and the joint. The control parameters may be controlled based on the sensor measurements. The sensors may be configured to measure rotation of the first gimbal, the second gimbal, and the second shaft, and may further be configured to transmit the measurements to a data processor in order to control the control parameters.

In the case of the control stick being used to control the flight of an aircraft, the first control parameter controls the pitch, the second control parameter controls the roll, and the third control parameter controls the yaw. Alternatively, the first control parameter may control the roll, the second control parameter may control the pitch, and the third control parameter may control the yaw.

The control parameters may be used to control the movement of flight surfaces of fixed or swing wing aircraft such as ailerons, flaps, flaperons, spoilerons, rudders etc. They may also be used to control the angle of attack of blades in a helicopter to control pitch, roll, lift, yaw, etc. They may control watercraft such as hydrofoils, submarines, hovercraft, or land-based vehicles, or systems such as a cranes and hoists, or remote drones, or robots, or simulators etc.

The control stick may be arranged such that the dynamics or motions of the aircraft as controlled by the control parameters correspond intuitively to the motions made by the pilot in moving the control stick to control those motions. For example, movement of the control stick in a forward and backward direction may control the pitch of the aircraft, movement in a left and right direction may control the roll, and rotation of the grip 102 may control the yaw (e.g. by controlling the rudders).

The above described configuration allows control of a vehicle such as an aircraft. For example, the control stick may control pitch, roll, and yaw of an aircraft, depending on a pilot's movement of the control stick about three axes which intersect at a single point. Alternatively, the control stick may be used to control any system in which there are at least three degrees of freedom required. The intersection of the axes can improve the usability of the control stick and coincide with the pilot's intuitive understanding of the controls. The above described system may also be made compactly so as to free up space for other systems. The arrangement of the control stick may provide a more compact assembly than known assemblies, by virtue of the joint being nested within the gimbal mechanism, and the axes intersecting at a single point within the joint.

The compact arrangement can minimise the feeling of inertia in the control system. The weight of the flight control systems can be reduced significantly. Acquisition of the component parts of the assembly can be straightforward. Installation and maintenance costs can be reduced. Space in the region of the pilot's legs can be made available, as well as space below the floor of the cockpit.

The systems of the present disclosure, as described above and shown in the drawings provide for a control stick with superior properties including improved usability and size.

While the apparatus of the subject disclosure have been shown and described with reference to embodiments, those skilled in the art will readily appreciate that changes and/or modifications may be made thereto without departing from the scope of the subject disclosure.

The invention claimed is:

1. An aircraft control stick module comprising an assembly, the assembly comprising:
   a first shaft;
   a second shaft;
   a joint connecting the first and second shafts; and
   a gimbal mechanism,
   wherein the joint is nested within the gimbal mechanism and an origin of rotation of the joint is coincident with an origin of rotation of the gimbal mechanism;
   wherein the gimbal mechanism provides axes of rotation for the first shaft and the joint provides axes of rotation for the first shaft;
   wherein the axes of rotation provided by the gimbal mechanism and the axes of rotation provided by the joint intersect at the coincident origins of rotation;
   wherein the gimbal mechanism comprises a first gimbal disposed within and rotatably coupled to a second gimbal;
   wherein the second gimbal is disposed within and rotatably coupled to a fixed module frame; and
   wherein the assembly comprises sensors to measure and/or monitor the rotation of the first gimbal, the second gimbal, and the second shaft about a length of the second shaft.

2. The module of claim 1, wherein the first shaft is rotatable about each of a first axis, a second axis, and a third axis; and
   wherein rotation of the first shaft about the first axis causes the first gimbal to rotate about the first axis, rotation of the first shaft about the second axis causes the first and second gimbals to rotate about the second axis, and rotation of the first shaft about the third axis causes rotation of the second shaft about a length of the second shaft.

3. The module of claim 2, wherein rotation of the first gimbal about the first axis controls a first control parameter, rotation of the second gimbal about the second axis controls a second control parameter, and rotation of the second shaft about its length controls a third control parameter.

4. The module of claim 2, wherein the first, second and third axes intersect with each other within the joint.

5. The module of claim 2, wherein the third axis is defined along the length of the first shaft.

6. The module of claim 1, wherein the assembly further comprises a grip mounted on the first shaft.

7. The module of claim 1, wherein the assembly is a control stick for a control system for controlling an aircraft.

8. The module of claim 7, movement of the grip in fore and aft directions controls pitch, movement of the grip in left and right directions controls roll, and rotation of the grip about its length controls yaw.

9. The module of claim 1, wherein the joint is a universal joint.

10. A method of controlling a control system comprising the module of claim 1, the method comprising:
    rotating the first shaft about the origin of rotation of the joint nested within the gimbal mechanism, during which the origin of rotation of the joint coincides with the origin of rotation of the gimbal mechanism.

11. The method of claim 10, further comprising:
    rotating the first shaft and the first gimbal about the first axis to control the first control parameter of an aircraft;
    rotating the first shaft, the first gimbal, and the second gimbal about the second axis to control the second control parameter of the aircraft; and
    rotating the first shaft about the third axis to control the third control parameter of the aircraft.

* * * * *